United States Patent
Cunha et al.

(10) Patent No.: US 7,808,446 B2
(45) Date of Patent: *Oct. 5, 2010

(54) ACTIVE DISPLAY SYSTEM AND METHOD WITH OPTICAL ADDRESSING

(75) Inventors: John Da Cunha, Corvallis, OR (US); William Allen, Corvallis, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1057 days.

This patent is subject to a terminal disclaimer.

(21) Appl. No.: 11/495,353

(22) Filed: Jul. 27, 2006

(65) Prior Publication Data

US 2006/0262034 A1 Nov. 23, 2006

Related U.S. Application Data

(63) Continuation of application No. 10/192,984, filed on Jul. 10, 2002, now Pat. No. 7,129,910.

(51) Int. Cl.
*G09G 5/00* (2006.01)

(52) U.S. Cl. .............................. 345/1.2; 345/30; 345/204

(58) Field of Classification Search .................. 345/1.1, 345/1.2, 1.3, 2.1, 2.3, 30, 55, 204; 348/191, 348/658, 745–747, 804
See application file for complete search history.

(56) References Cited

U.S. PATENT DOCUMENTS

| | | | |
|---|---|---|---|
| 4,268,826 A | 5/1981 | Scott et al. | |
| 5,153,761 A | 10/1992 | Marlor | |
| 5,523,769 A | 6/1996 | Lauer et al. | |
| 5,612,710 A | 3/1997 | Christensen et al. | |
| 5,767,818 A * | 6/1998 | Nishida | 345/1.1 |
| 5,796,391 A * | 8/1998 | Chiu et al. | 345/204 |
| 5,818,425 A * | 10/1998 | Want et al. | 345/158 |
| 5,959,617 A | 9/1999 | Bird et al. | |
| 5,977,937 A * | 11/1999 | Michaelis | 345/30 |
| 6,101,038 A | 8/2000 | Hebert et al. | |
| 6,208,445 B1 | 3/2001 | Reime | |
| 6,236,167 B1 | 5/2001 | Yamaguchi et al. | |
| 6,271,815 B1 | 8/2001 | Yang et al. | |

(Continued)

FOREIGN PATENT DOCUMENTS

| | | |
|---|---|---|
| EP | 109832 A2 | 5/1984 |
| EP | 0933753 A2 | 8/1999 |
| EP | 0961502 A2 | 12/1999 |
| EP | 1202162 A1 | 5/2002 |
| EP | 1353312 A1 | 10/2003 |

(Continued)

OTHER PUBLICATIONS

Mahler, Reiner, "Optische ubertragung von Videosignalen" Fernseh und Kino Technik, 40, Jahrgang—Nr May 1986, pp. 217-221.

*Primary Examiner*—Quan-Zhen Wang
*Assistant Examiner*—Tom V Sheng

(57) ABSTRACT

A display system, including an optical transmitter configured to optically transmit digital image information associated with an image to be displayed. The system also includes an active display including a decoder electrically coupled with a plurality of display elements that are configured to produce visible light in response to electrical stimulation. The decoder is configured to receive the digital image information and in response produce a control signal for each of the display elements, the control signals being usable to individually control visible light produced by the display elements so as to cause display of the image.

5 Claims, 2 Drawing Sheets

U.S. PATENT DOCUMENTS

| | | |
|---|---|---|
| 6,285,343 B1 | 9/2001 | Brody |
| 6,344,836 B1 | 2/2002 | Suzuki |
| 6,370,273 B1 | 4/2002 | Kuo |
| 6,580,422 B1 | 6/2003 | Reilly |
| 6,900,777 B1 * | 5/2005 | Hebert et al. .................. 345/7 |
| 7,091,926 B2 * | 8/2006 | Kulas ........................ 345/1.1 |
| 7,129,910 B2 * | 10/2006 | Da Cunha et al. ............ 345/1.2 |
| 2002/0033779 A1 | 3/2002 | Nakai et al. |
| 2002/0048323 A1 | 4/2002 | Kang et al. |
| 2004/0085271 A1 | 5/2004 | Koll et al. |

FOREIGN PATENT DOCUMENTS

| | | |
|---|---|---|
| FR | 2652185 A1 | 9/1989 |
| JP | 2000022632 A | 1/2000 |
| WO | WO0239417 A1 | 5/2002 |

* cited by examiner

ACTIVE DISPLAY SYSTEM AND METHOD WITH OPTICAL ADDRESSING

CROSS-REFERENCE TO RELATED APPLICATION

This is a continuation of application Ser. No. 10/192,984 filed on Jul. 10, 2002 now U.S. Pat. No. 7,129,910, which is hereby incorporated by reference.

BACKGROUND OF THE INVENTION

Various techniques exist for displaying still and moving images. One such technique involves the use of passive optical projection systems, which commonly employ a projector in connection with a passive display screen. In passive systems, all of the optical energy to display an image is typically generated by the projector. This often requires use of expensive bulbs or lamps that can consume a significant amount of power and generate excessive heat. Many systems employ cooling fans to dissipate the excess heat. The cooling fans often produce undesirable noise, in addition to adding to the manufacturing expense and complexity of the projection system. In addition, passive systems commonly employ mirrors, color wheels, polarizers and other optical components between the light source and the display screen. These components can increase the expense of the system, degrade image quality, and make it difficult to maintain image quality when producing images of varying size and/or brightness.

SUMMARY OF THE INVENTION

A display system is provided, including an optical transmitter configured to optically transmit digital image information associated with an image to be displayed. The system also includes an active display including a decoder electrically coupled with a plurality of display elements that are configured to produce visible light in response to electrical stimulation. The decoder is configured to receive the digital image information and in response produce a control signal for each of the display elements, the control signals being usable to individually control visible light produced by the display elements so as to cause display of the image.

DETAILED DESCRIPTION

The invention is directed to a method and apparatus for displaying images. In this context, images may include still images or video images and, for consistency, will be referred to herein as images.

Figure 1:
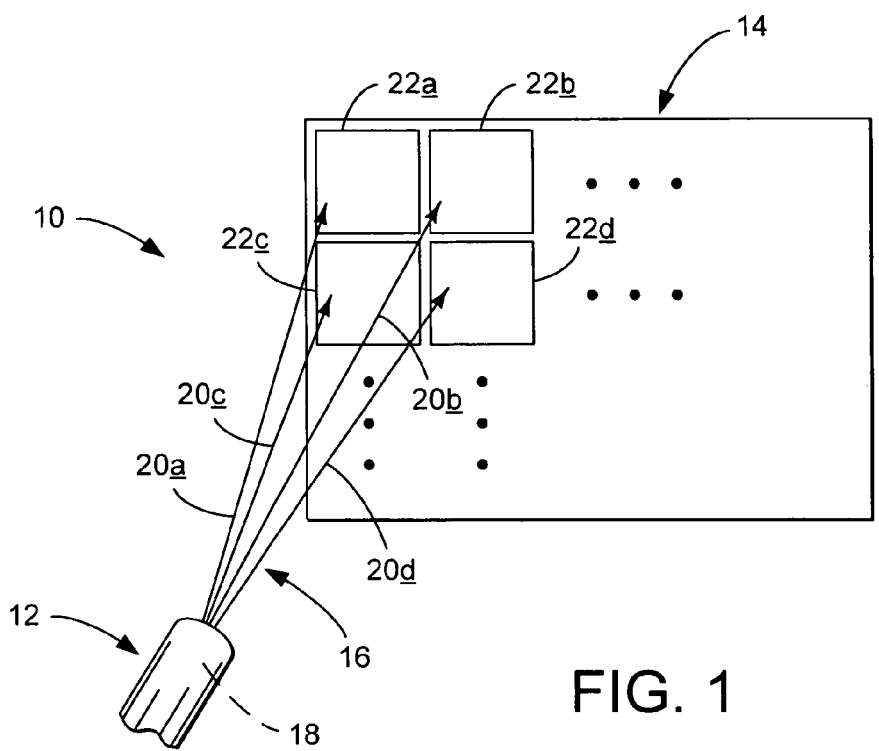
FIG. 1 is a schematic depiction of an active display system according to an embodiment of the invention.

FIG. 1 depicts a display system 10 for displaying images. System 10 includes an optical transmitter 12 and an active display 14. Optical transmitter 12 optically transmits image information 16 for receipt at active display 14. Active display 14 responds to the image information in order to actively display an image based on image information 16.

Active display 14 typically includes a plurality of display elements that are controlled based on image information 16 to produce an image. For example, in the depicted exemplary embodiment, active display 14 includes a plurality of emissive components configured to emit visible light. The quality of the light produced by each of the individual emissive components determines how the overall image will appear to the viewer. As explained in more detail below, the state of each emissive component may be individually varied to control the color, brightness and other characteristics of the light produced by the emissive component.

For moving images, the states of the individual emissive components are changed periodically to create the moving image. For example, the intensity of a particular emissive component may be varied at regular intervals known as frames. A typical frame rate in video applications is 60 frames per second. In such an application, controlling the state of each individual emissive component over a number of successive frames produces, from the viewer's perspective, a moving image.

As indicated above, optical transmitter 12 provides the information that is used to control the states of the individual emissive components in active display 14. In contrast to the projectors that are often used in passive systems, optical transmitter 12 normally is not configured to project light of sufficient intensity to produce a viewable image on a passive screen or other passive display device. As such, optical transmitter 12 may not need to employ expensive, high-intensity bulbs, such as those commonly used in passive systems to produce the light that forms the displayed image. Nor does optical transmitter 12 necessarily need to employ the cooling fans associated with such systems, or the mirrors, lenses and other optical devices often used in passive systems. Instead of using high-intensity light, optical transmitter 12 typically conveys image information 16 to active display 14 via low intensity light, as explained in more detail below.

Optical transmitter typically includes one or more emitters 18, or like optical transmission devices configured to transmit image information 16 via low intensity light. The image information typically is transmitted as a number of spatially separated beams 20 of low-intensity infrared light, with each beam corresponding to a portion 22 of active display 14. Particular beams 20 and corresponding display portions 22 are individually designated with letters (a, b, etc.) following the reference number. As explained in more detail below, each beam typically includes a serial bitstream of digitally encoded information, which may be used to control behavior of the emissive components in a given portion of active display 14.

Portions 22 may also be referred to as sub-arrays of active display 14. In the depicted example, each beam 20 carries image information corresponding to a portion of the overall image to be presented on the corresponding sub-array 22. For example, beam 20a corresponds to sub-array 22a and carries information used to produce images on that sub-array. Each sub-array includes a decoder or like processing subsystem that is configured to receive the image information encoded within the low intensity light beam. Upon receiving the beam, the decoder processes the encoded image information to produce individual control signals for the various emissive components contained within the sub-array. Based on the control signals produced within each sub-array, the sub-arrays collectively produce the overall image presented to a viewer by active display 14.

As seen in FIG. 1, display system 10 may be implemented as a front projection system, in which the viewer is on the same side of active display 14 as optical transmitter 12. Display system 10 may also be implemented in a rear projection configuration, in which the optical transmitter and viewer are on opposite sides of the active display. Generally, the viewer, optical transmitter and active display may be in a desired relative orientation that allows the transmitter to optically transmit image information to the active display.

It should be appreciated that the individual sub-arrays are optically addressed, instead of electrically addressed. In this context, "addressing" refers to the manner in which image information is delivered to a particular component of display system 10. In the depicted embodiment, optical transmitter 12 optically addresses sub-arrays because it delivers image information 16 via optical transmission, instead of with a wired electrical coupling. Though the sub-arrays are normally optically addressed, the individual emissive components within a sub-array often are electrically addressed, as will be explained below.

Active display 14 may include a single sub-array 22, or any other number of sub-arrays, as desired. Display system 10 is extremely flexible, in that it is relatively simple to change the size of the display by simply adding sub-arrays 22. To accommodate the added sub-arrays, transmitter 12 may be easily reconfigured to provide image information to the new sub-arrays. The optical addressing methods described above greatly simplify varying the display size, because no physical reconfiguration of the addressing connections is necessary. In addition, the optical addressing allows the density of emissive components in the sub-arrays to be increased without significantly increasing the overall complexity of the system. By contrast, in electrically addressed systems, adding emissive components (e.g., to increase display size or brightness) requires physical reconfiguration of the addressing circuitry, and usually involves a significant increase in the overall complexity and manufacturing expense of the display system.

It should be understood that one or more beams 20 of image information may be used. Often it will be desirable to have the beams and sub-arrays in a one-to-one relationship, such that each beam carries image information for a single designated one of the sub-arrays. Alternatively, image information for a particular sub-array may be contained in multiple beams 20. Yet another alternative is to have an individual beam carry image information for multiple sub-arrays. In such a case, the beam is aimed at the multiple sub-arrays so that each of the corresponding sub-arrays can receive the information. The digital information encoded in the beam includes addressing/header information which enables each of the receiving sub-arrays to identify and process the respective portions of the image information in the beam.

Figure 2:
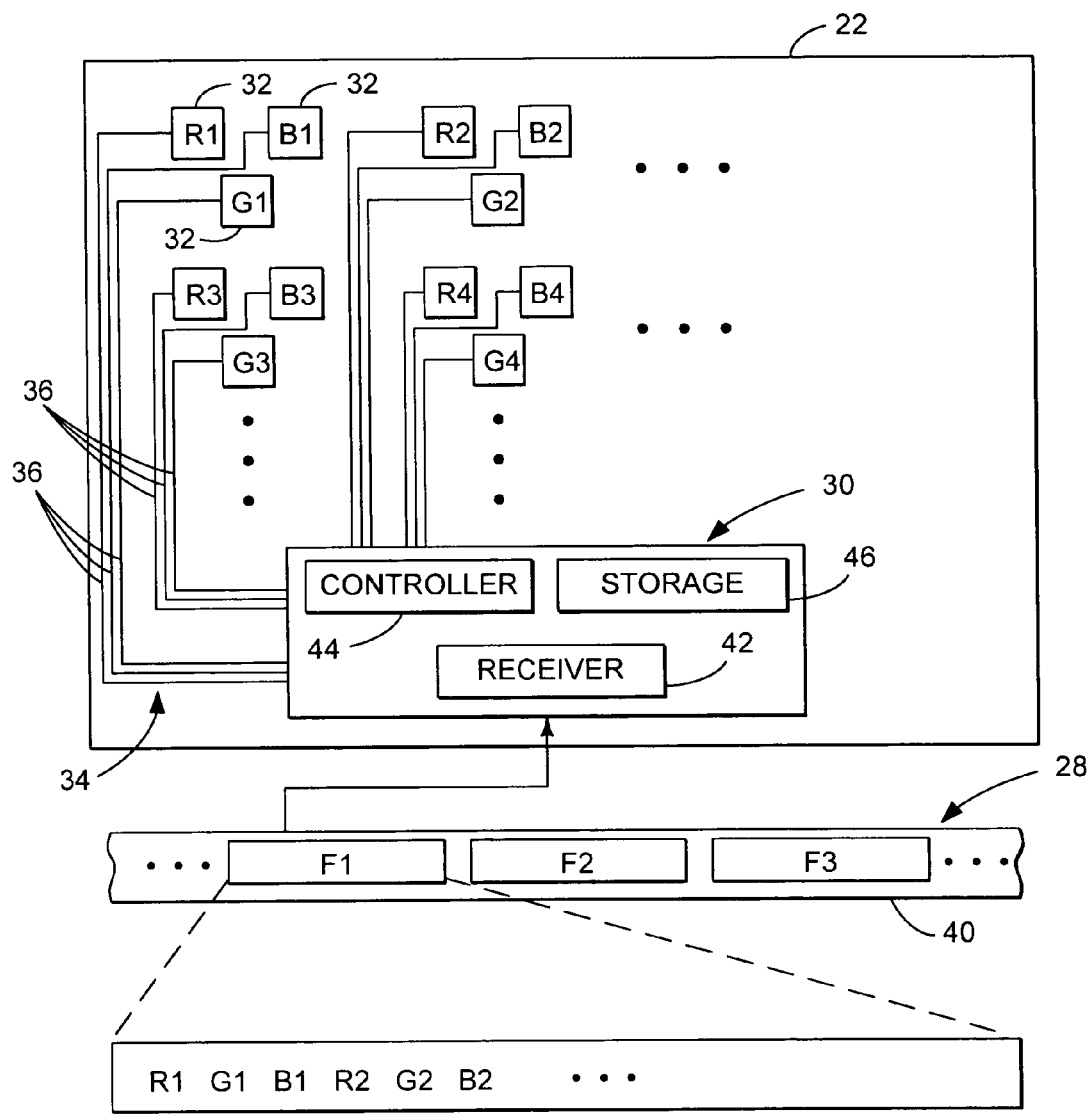
FIG. 2 is a schematic depiction of an exemplary sub-array that may be implemented in connection with the system of FIG. 1, together with image information used to control operation of the sub-array.

FIG. 2 schematically depicts an individual sub-array 22, along with image information 28 used to control operation of the sub-array. As indicated, sub-array 22 typically includes a decoder 30 electrically coupled with a number of display elements such as emissive components 32. Decoder 30 receives and processes image information 28, so as to produce control signals corresponding to the emissive components coupled with the decoder. These control signals control visible-spectrum light produced by the emissive components, and thus control the image produced by sub-array 22.

Emissive components 32 may be of any suitable construction or type, provided they are capable of producing visible-spectrum light to form an image. The depicted embodiment includes red (R), green (G) and blue (B) emissive components organized into pixels, with each pixel containing one of each color component. For example, components R1, G1 and B1 collectively form a pixel; R2, G2 and B2 form another pixel. Alternatively, in other embodiments, a pixel may consist of only a single display element (e.g. an individual emissive component). The individual components in each pixel may be referred to as sub-pixels, and typically are independently controlled as explained below in order to vary the color and intensity of the light produced by the pixel. As indicated, any number of emissive components and pixels may be provided in a sub-array. Also, colors other than red, green and blue may be used, such as white, cyan, magenta, yellow, etc. Furthermore, although emissive components are described herein, transmissive components (such as in an LCD), reflective components (such as in e-paper) or any number of other components capable of controlling light may be used.

As indicated, decoder 30 typically is coupled with the emissive components of sub-array 22 via an electrical connection such as coupling 34. A wide variety of coupling methods and topologies may be used. As seen in the depicted embodiment, it will often be appropriate to use parallel address lines 36 running between decoder 30 and each of the emissive components, with an individual address line being provided for each emissive component. Alternatively, a bus arrangement or other type of topology may be employed to electrically connect the decoder and emissive components.

Figure 3:
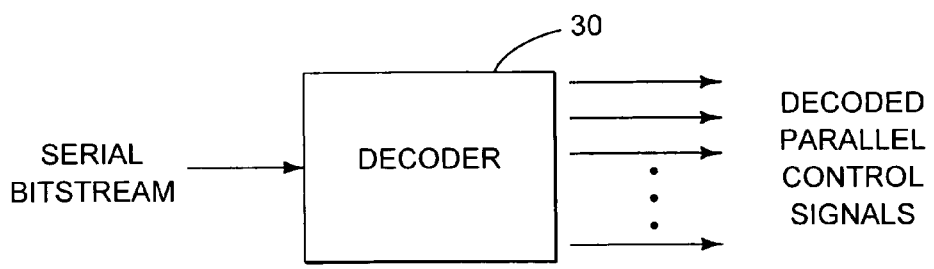
FIG. 3 schematically depicts a structure and methodology that may be used with the sub-array of FIG. 2 to process an incoming serial bitstream of image information.

As indicated above, decoder 30 receives digital image information in optic form and converts that information into control signals corresponding to emissive components 32 of sub-array 22. Typically, this conversion is implemented as a serial-to-parallel conversion, as schematically illustrated in FIG. 3. Specifically, decoder 30 receives image information in the form of a serial bitstream of digitally encoded information. This bitstream may include various types of information relating to the image to be displayed. For example, the bitstream might specify that a particular emissive component is to be activated at a particular intensity during an upcoming video frame. In any event, as indicated, the serial bitstream is decoded and separated into multiple control signals that are delivered in parallel to a plurality of emissive components.

Referring again to FIG. 2, the figure also shows image information 28 being provided to sub-array in the form of a serial bitstream 40. As shown, it will often be desirable to organize the image information in bitstream 40 into sequential frame segments F1, F2, F3, etc. Each frame segment includes image information corresponding to the image to be displayed by sub-array 22 during a given video frame. For example, F1 contains information for a first frame, F2 for a second successive frame, F3 for the next frame, and so on. As this information is received by decoder 30, it is successively processed and employed to control the images produced on sub-array 22 during a series of sequential video frames.

The frame segments typically include information corresponding to each of the individual emissive components within the sub-array. For example, as indicated, segment F1 contains information corresponding to emissive components R1, G1, B1, R2, G2, B2, etc. Such information may, for example, specify the intensity for the corresponding emissive components during the F1 frame. Alternatively, the bitstream may be organized by pixel, sub-pixel or according to other data structures or schemes.

Referring specifically to decoder 30, the decoder typically includes some form of optical receiver 42 to receive the incoming optical image information 28. This may be implemented with a phototransistor, photodiode or like device. Receiver 42 is configured to receive the incoming digital bitstream and convert the digital pulses into electrical signals used to control the emissive components of the sub-array 22. The conversion may be effected by the receiver alone, or in combination with other components.

Decoder 30 also performs an address decoding function, to ensure that control signals are supplied to appropriate emissive components 32 in sub-array 22. Various decoding/addressing schemes may be used. For example, a relatively simple scheme would be to assign the first N bits in a frame to the first pixel (R1, G1, and B1), the second N bits to the next pixel (R2, G2, and B2), and so on. Alternatively, the image information for a given emissive component may include not only brightness/color information, but also address information that specifies the particular address lines 36 that are to be used to control that emissive component.

Decoder may also include a controller 44, storage 46, and/or various other components to aid in the receiving, decoding, addressing and other functions described above. Storage 46, for example, may be used to provide a temporary buffer to hold control signals until all of the control signals are ready for simultaneous parallel delivery to emissive components 32. Controller 44 may assist in synchronized delivery of the control signals through issuance of synchronization signals. The decoder thus may be responsive to synchronization signals to synchronize application of the control signals to the emissive components.

Figure 4:
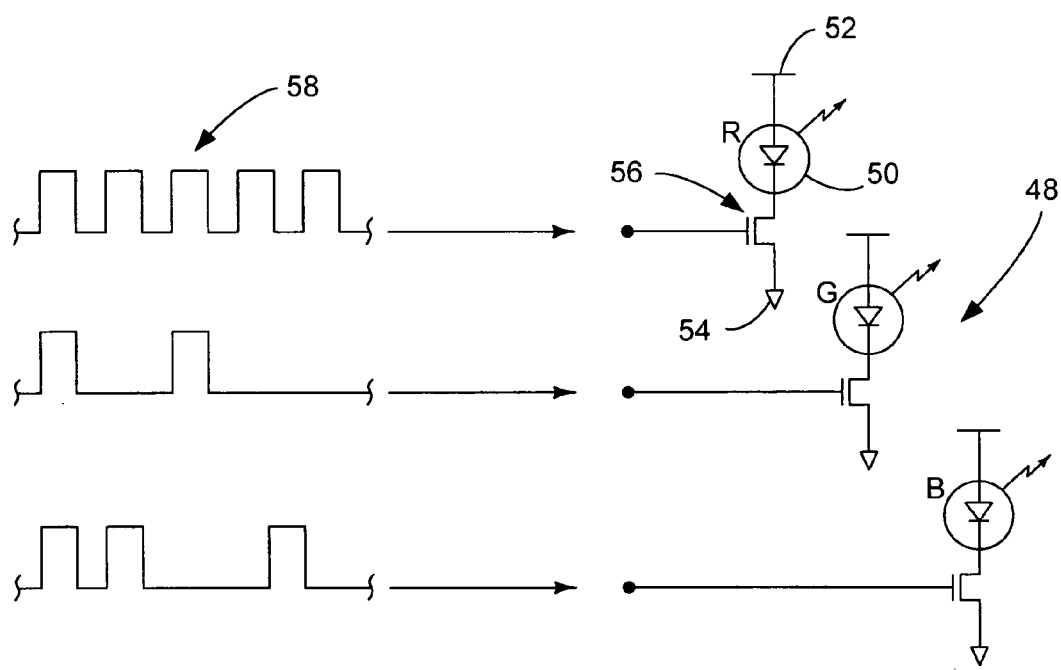
FIG. 4 is a schematic depiction of an exemplary group of emissive elements that may be implemented in connection with the embodiments of FIGS. 1 and 2.

Referring now to FIG. 4, exemplary red, green and blue emissive components of a representative pixel 48 are depicted. As indicated, each includes a light-emitting device that is controlled via application of a control signal. Referring specifically to the red portion of the pixel, a red light-emitting diode (LED) 50 is coupled between positive supply 52 and ground 54. LED 50 is in series with a switch, such as transistor 56, which is responsive to control signal 58 in order to control the current flowing through the LED.

Typically, control signal 58 is provided during a given video frame as one or more fixed amplitude voltage pulses having a fixed time duration. The voltage pulses are provided to the emissive components via the electrical connections between decoder 30 and emissive components 32 (FIG. 2). The number of pulses occurring within a frame then determines a characteristic of light produced by the LED for that frame, for example, light intensity.

The relationship between the control signal and the light produced by a given pixel within a video frame may be more clearly understood in the context of a 24-bit RGB color system. In such a system, 8 bits are provided for each of the red, green and blue emissive components of a given pixel. Thus, 256 intensities of red are available, as are 256 intensities of green and blue. This yields 256×256×256, or roughly 16.8 million combinations of intensities for the three components. Such systems are often referred to as providing 16.8 million colors.

To accomplish 256 gradations for each of the colors, the video frame is divided into 255 intervals. During each such interval, a fixed amplitude voltage pulse may be applied to the switch that controls the current through the respective LED (e.g., transistor 56). To provide varying intensities of red light during a frame, the switch would be pulsed from anywhere between 0 and 255 of the available time intervals. No pulse would mean no red contribution to the pixel during that frame. 255 pulses would be the maximum contribution of red to the pixel.

Control signal 58 may be considered a duty-cycle modulated pulse train. As explained above, the digital image information for the depicted sub-array includes intensity information for each of the emissive components in the sub-array. This intensity information is used to modulate the duty time of the control signal for the frame. In other words, as the intensity specified by the image information for a given emissive element increases, such as with pulse width modulation, the amount of time that control signal 58 is pulsed high during the given frame increases. In the depicted example, the individual pulses are of fixed duration (width), so increasing the duty time for a given frame involves increasing the number of pulses that are applied to transistor 56 during that frame. Various such methods may be employed, including pulse width modulation, pulse position modulation, etc.

For typical frame rates, such as 60 frames per second, the pulses normally can occur at any time during the frame, and multiple pulses need not be symmetrically spaced in time. For example, at 60 frames per second in a 24-bit system as described above, assume that the image information specifies a red intensity value of 4, on a scale from 0 to 255. This equates to a control signal 58 that is pulsed 4 times during the frame. These 4 pulses can occur clumped together in adjacent time intervals, evenly distributed through the frame, or at any other relative time, because the human eye typically will not perceive the difference at a frame rate of 60 frames per second.

It should be appreciated that the above system provides for control over both the color and brightness of a given pixel. For example, in the 24-bit example given above, a pixel with an RGB value of 128-128-128 typically would be the same hue as a pixel with an RGB value of 4-4-4, because the relative contributions of the three emissive components are equal. However, the 128-128-128 pixel would be much brighter.

It should be further understood that any desired color depth may be used, and the above 24-bit system is provided merely as an example. More or less than 8 bits may be used to specify the number of intensity gradations for a given emissive component.

Additionally, or alternatively, analog methods may be used to control the intensity of the light produced by the LEDs. For example, instead of using fixed amplitude voltage pulses to intermittently activate the LED switches, decoder 30 may be configured to provide variable amplitude control signals to the LED switches. Referring specifically to red LED 50, the intensity during a given interval would be controlled by applying a voltage during the entire duration of the video frame. The level (amplitude) of this voltage would be increased or decreased to vary the intensity to a desired level.

While the present invention has been particularly shown and described with reference to the foregoing preferred embodiments, those skilled in the art will understand that many variations may be made therein without departing from the spirit and scope of the invention as defined in the following claims. The description of the invention should be understood to include all novel and non-obvious combinations of elements described herein, and claims may be presented in this or a later application to any novel and non-obvious combination of these elements. Where the claims recite "a" or "a first" element or the equivalent thereof, such claims should be understood to include incorporation of one or more such elements, neither requiring nor excluding two or more such elements.

What is claimed is:

1. A display system, comprising:
   an optical transmitter configured to optically project digital image information associated with an image to be displayed; and
   an active display including a decoder coupled with a plurality of display elements that are configured to produce visible light, where the decoder is configured to receive the projected digital image information and in response produce a control signal for each of the display elements, the control signals being usable to individually control visible light produced by the elements so as to cause display of the image;

where the image information includes intensity information for each of the display elements, and where the decoder is configured to use such intensity information to duty-cycle modulate a pulse train for each display element, the pulse train being operable to intermittently activate the respective display element.

2. The display system of claim 1, where some of the display elements are configured to produce red light, some of the display elements are configured to produce green light, and some of the display elements are configured to produce blue light.

3. The display system of claim 2, where groupings of the display elements define pixels, with each pixel containing red, green and blue sub-pixels.

4. A display system, including:
transmission means for optically projecting image information associated with an image to be displayed; and
an active display including a plurality of sub-arrays, each having:
plural display elements, each producing visible light in response to electrical stimulation; and
decoder means for optically receiving a portion of the projected image information and generating a plurality of control signals based on such portion of the image information, the decoder means being coupled with the visible light-producing means and configured to duty-cycle modulate a pulse train for each display element, the pulse train being operable to intermittently activate a respective display element so as to cause display of a portion of the image.

5. The display system of claim 4, where the transmission means includes an optical projector configured to project the image information with infrared light via one or more serial bitstreams.

* * * * *